United States Patent [19]

Regan

[11] 3,791,033
[45] Feb. 12, 1974

[54] SKINNING KNIFE
[76] Inventor: James L. Regan, 409 Dunkel St., Fairbanks, Alaska 99790
[22] Filed: Mar. 7, 1972
[21] Appl. No.: 232,426

[52] U.S. Cl. .................................. 30/287, 30/155
[51] Int. Cl. ............................................ B26b 29/02
[58] Field of Search ..... 30/125, 155, 286, 294, 287, 30/289, 288, 299

[56] References Cited
UNITED STATES PATENTS

| | | | |
|---|---|---|---|
| 3,363,315 | 1/1968 | Anderson | 30/286 X |
| 2,906,021 | 9/1959 | Cromoga | 30/155 X |
| 2,098,123 | 11/1937 | Wood | 30/287 |
| 732,911 | 7/1903 | Abbey | 30/287 |
| 3,439,420 | 4/1969 | Erickson | 30/294 |

Primary Examiner—Donald G. Kelly
Assistant Examiner—J. C. Peters
Attorney, Agent, or Firm—Nathaniel A. Humphries

[57] ABSTRACT

A skinning knife with a handle having a pivotal skinning blade is disclosed with the skinning blade comprising a main blade member and a tip blade member perpendicular to the main blade member. A tip sheath is movable to cover the tip for a gutting operation but leaves the cutting edge of the main blade clear for slicing the hide; another embodiment shows the tip being of conical shape.

4 Claims, 8 Drawing Figures

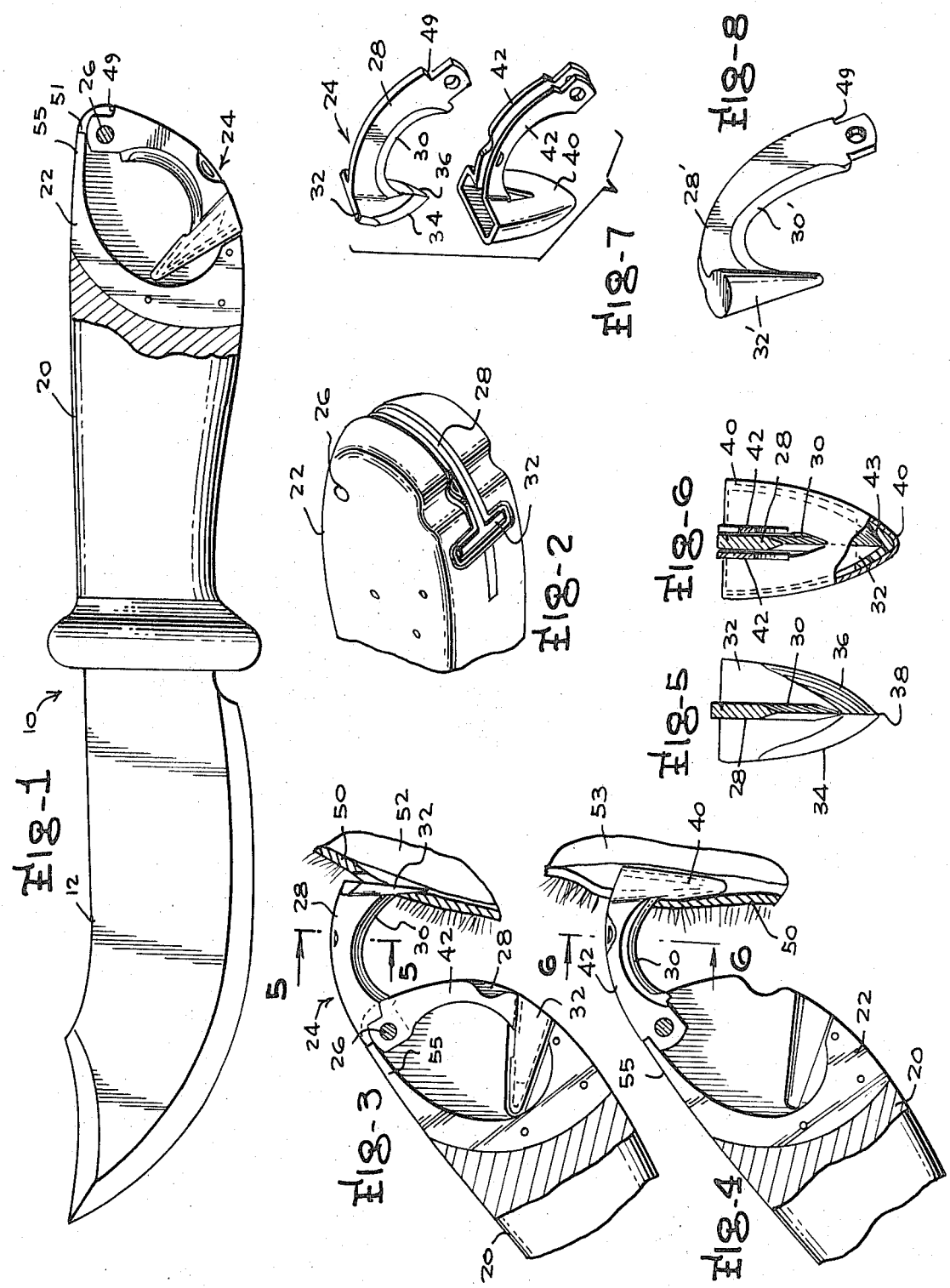

SKINNING KNIFE

This invention is in the field of cutting implements and is specifically directed to the field of knives and is even more specifically directed to the field of skinning or gutting knives.

The proper cleaning of game such as deer and of domestic animals such as hogs, for example, requires the slitting of the belly skin of the animal from an area adjacent the ribs to the crotch in order to enable the removal of intestines etc. from the carcass. Any accidental cutting of the intestines is extremely undesirable and is to be avoided if at all possible. Similarly, the mutilation of the flesh of the carcass beneath any part of the hide is also obviously undesirable and should be avoided if possible. However, the dressing of animals both in the field and in commercial installations must frequently be expedited and accidental cutting of the carcass frequently occurs.

Therefore, it is the primary object of this invention to provide a new and improved knife means for cutting the hide of an animal as rapidly as possible with little or no danger of cutting the portions of the carcass immediately beneath the hide.

Obtainment of the object of this invention is enabled through the provision of a knive construction employing a main blade member having a forward cutting edge and terminating in a flat tip extending perpendicularly to the main blade so that the tip moves immediately beneath the hide to separate the hide from the portions of the carcass beneath the tip. The forward edges of the tip are provided with sharp cutting edges to enable forward movement of the blade as easily as possible while separating the hide from the carcass immediately adjacent both sides of the cut through the hide made by the main blade member.

The skinning blade is pivotally mounted in the end of the handle of a hunting knife in the preferred embodiment and includes a metal sheath movable into covering position over the blade tip but leaving the cutting edge of the main blade uncovered for use in gutting operations. In a second embodiment of the invention, the blade member is provided with a conical tip having a pointed forward end which is of thicker construction adjacent the rear edge of the blade than the flat plate so as to provide a separation of hide from the carcass during the cutting operation without damage to the carcass.

A better understanding of the subject invention will be obtained when the following written descripton is read in conjunction with the appended drawings in which:

FIG. 1 is a view of a knife comprising the preferred embodiment of the invention with portions in section to illustrate the inner components;

FIG. 2 is a perspective view of the end of the knife handle of the preferred embodiment illustrated in FIG. 1 with the skinning blade in a closed position;

FIG. 3 illustrates the skinning blade in an open position during a skinning operation with the tip sheath not being in use;

FIG. 4 illustrates a gutting operation with the sheath being in position;

FIG. 5 is a sectional view taken along lines 5—5 of FIG. 3;

FIG. 6 is a sectional view taken along lines 6—6 of FIG. 4;

FIG. 7 is an exploded perspective view of the blade member and tip sheath of the preferred embodiment; and FIG. 8 is a perspective view of a second embodiment of the blade member.

Attention is initially invited to FIG. 1 of the drawings which illustrates the preferred embodiment, generally designated 10, which is in the form of a hunting knife having a conventional blade 12 and handle 20.

The end of handle 20 is provided with a metal fitting 22 in which a skinning blade 24 is pivotally mounted for movement in a slot about a pin 26 between a recessed position illustrated in FIG. 1 and an extended position illustrated in FIGS. 3 and 4.

Blade 24 comprises a main blade portion 28 having a sharp forward edge 30 and a tip portion 32 extending perpendicularly across the end of the blade. Tip portion 32 is provided with first and second cutting edges 34 and 36 which merge at an apex 38 in alignment with the cutting edge 30 of the main blade portion 28.

A tip sheath 40 is also pivotally connected to the pin 26 and includes a pair of side plates 42 extending along opposite sides of the main blade 28. A plastic or other similar soft tip protector 43 is provided on the interior of sheath 40 for receiving and protecting the forward end of tip 32 when the sheath is enclosing the tip.

The blade 24 can be moved to the extended position illustrated in FIG. 3, while the tip 32 remains within the confines of the fitting 22. Blade 28 is normally employed singularly in the manner illustrated in FIG. 3 for a skinning operation so that the cutting edge 30 slits the hide 50 and the cutting edges 34 and 36 of tip blade 32 ride immediately adjacent and beneath the hide for separating the hide from that portion 52 of the carcass immediately beneath the tip 32. Consequently, a portion of the hide adjacent and on both sides of the slit made by blade 28 is removed from the carcass in its entirety since the edges of the slit will provide a hand hold enabling grasping of the hide for subsequent removal. Operation in this manner is quite feasible in all portions of the animal other than the belly portion.

However, when cutting the belly of the animal, it is desirable to move the tip sheath 40 into position covering the tip as shown in FIG. 4 so that there is no possibility of of accidental cutting of the intestines 53 to the consequent detriment of the carcass. In the mode of operation shown in FIG. 4, the tip sheath 40 fully encloses the tip 32 and the cutting operation is limited solely to the cutting edge 30 of the main blade portion 28.

FIG. 8 illustrates a second blade embodiment in which the main blade portion 28' is provided with a forward cutting edge 30' with the main difference from the first embodiment residing in the provision of a conical tip member 32' not having any cutting edges. For this reason, the second embodiment does not require a tip sheath in the manner of the first embodiment. The blade illustrated in FIG. 8 can be used as a cutting knife and for skinning other portions of an animal.

It is to be noted that all of the blade constructions employ a conventional rear blade portion including a shoulder 49 engageable with a surface 51 on the end of a conventional spring 55 forming part of fitting 22 for limiting rearward outward or pivotal movement of the blade members with respect to the handle. Therefore, it will be apparent that the mounting of the handle in the blade is accomplished in the manner conventionally employed in pocket knives and the like.

Numerous modifications of the subject invention will undoubtedly occur to those of skill in the art; however, it should be understood that the spirit and scope of the invention is to be limited solely by the appended claims.

I claim:

1. A skinning knife comprising a handle member, a skinning blade, means pivotally mounting said skinning blade in said handle member, said skinning blade including a main blade having a sharp forward cutting edge, a tip member comprising a blade having first and second sharp forward cutting edges intersecting at an apex in alignment with said cutting edge of the main blade mounted on the end of said main blade for cutting movement beneath the hide surface for separating the hide surface from the carcass therebeneath and a pivotal tip sheath movable into position to cover said tip blade for a gutting operation.

2. The invention of claim 1 additionally including first and second side plate means on said tip sheath extending adjacent each side of said main blade but positioned rearwardly of the cutting edge of said main blade.

3. The invention of claim 2 wherein said tip sheath and said main blade are pivotally connected to pin means in said handle.

4. The invention of claim 3 wherein said tip sheath is formed of metal.

* * * * *